(12) United States Patent  (10) Patent No.: US 8,747,048 B2
Born et al.                        (45) Date of Patent:       Jun. 10, 2014

(54) SYSTEM FOR LOADING, HANDLING, AND TRANSPORTING CONTAINERS

(75) Inventors: Michael C. Born, Downers Grove, IL (US); Brian C. Born, Schererville, IN (US); Roni Gregori, Dyer, IN (US); William M. Smith, Kewanee, IL (US)

(73) Assignee: Mi-Box Holding Co., Inc., Joliet, IL (US)

( * ) Notice: Subject to any disclaimer, the term of this patent is extended or adjusted under 35 U.S.C. 154(b) by 1904 days.

(21) Appl. No.: 11/845,378

(22) Filed: Aug. 27, 2007

(65) Prior Publication Data

US 2007/0292250 A1    Dec. 20, 2007

Related U.S. Application Data

(63) Continuation-in-part of application No. 11/230,753, filed on Sep. 20, 2005.

(51) Int. Cl.
    *B65B 21/02*        (2006.01)
(52) U.S. Cl.
    USPC .......................................... 414/491; 414/498
(58) Field of Classification Search
    USPC ................................. 414/491, 498
    See application file for complete search history.

(56) References Cited

U.S. PATENT DOCUMENTS

| | | |
|---|---|---|
| 2,437,806 A | 3/1948 | Dempster |
| 2,464,071 A | 3/1949 | Coffing |
| 3,235,105 A | 2/1966 | Loomis |
| 3,305,047 A | 2/1967 | Bronder |
| 3,521,780 A | 7/1970 | Cook |
| 3,754,777 A | 8/1973 | Riggs et al. |
| 4,071,147 A | 1/1978 | Hornagold |
| 4,365,921 A | 12/1982 | Brouwer et al. |
| 4,415,302 A | 11/1983 | Brouwer et al. |
| 4,527,458 A * | 7/1985 | Johnson ........................ 89/41.01 |
| 4,778,327 A | 10/1988 | Tufenkian et al. |
| 5,007,543 A | 4/1991 | Cooke |
| 5,391,043 A | 2/1995 | Bohata et al. |
| 5,706,960 A | 1/1998 | Pitman et al. |
| 5,967,736 A | 10/1999 | Poindexter |
| 6,019,567 A | 2/2000 | Lutkus et al. |
| 6,071,062 A | 6/2000 | Warhurst et al. |
| 6,077,028 A | 6/2000 | Hassenplug et al. |
| 6,155,770 A | 12/2000 | Warhurst |
| 7,074,004 B2 * | 7/2006 | Lockamy et al. ............. 414/549 |
| 7,150,472 B1 | 12/2006 | Schneider |
| 7,241,100 B2 | 7/2007 | Lockamy et al. |
| 7,264,437 B2 | 9/2007 | Lockamy et al. |
| 7,270,511 B2 | 9/2007 | Lockamy et al. |

* cited by examiner

*Primary Examiner* — Saul Rodriguez
*Assistant Examiner* — Willie Berry, Jr.
(74) *Attorney, Agent, or Firm* — McAndrews, Held & Malloy, Ltd.

(57) ABSTRACT

A system for lifting, handling, and transporting containers includes a trailer that is either connectable to a truck or permanently affixed to a truck. The trailer has front and rear ends and is configured to receive and hold a container. A dolly is mounted on the trailer to lift and handle the container while maintaining the container in an upright orientation. The dolly may travel between the front and rear ends of the trailer and may be rotatable to face left and right sides of the trailer.

16 Claims, 13 Drawing Sheets

SYSTEM FOR LOADING, HANDLING, AND TRANSPORTING CONTAINERS

RELATED APPLICATIONS

This application is a continuation-in-part of U.S. patent application Ser. No. 11/230,753, which was filed Sep. 20, 2005, and which is hereby incorporated by reference.

BACKGROUND OF THE INVENTION

Embodiments of the present invention generally relate to a system for transporting containers, and more particularly to a vehicle or trailer that includes an apparatus for lifting, handling, and transporting a container.

The freight and shipping industries often have requirements related to lifting and transporting containers. Centralized locations typically include cranes, forklifts, or other apparatus for lifting and handling containers. In the field, however, no such apparatus for lifting and handling containers exists. Thus, vehicles such as trucks must be equipped with their own apparatus for loading and unloading containers at remote locations. Additionally, certain laws impose certain width maximums for road travel. Both the trucks and the containers they carry must meet those width restraints. Thus, it is desirable to have trucks capable of carrying containers as wide as possible while not exceeding those width restraints.

U.S. Pat. Nos. 6,071,062 and 6,155,770, assigned to Pods, Inc., employ a truck that can load and unload specially configured containers at remote locations and transport those containers.

The embodiments shown in the '062 and '770 patents disclose a truck having an apparatus for loading, unloading, and supporting containers of substantially the same width as that of the truck itself. The truck includes a carrier frame that detaches from the truck for loading the specially configured containers. The carrier frame, like the container, is rectangularly shaped. When the carrier frame is detached from the truck's platform, it can be moved into position to surround, engage, and lift the container. Before the carrier frame detaches from the truck's platform, the carrier frame's wheels must descend to contact the ground and the carrier frame's width must be increased by extending the carrier frame's transverse bars. The carrier frame's width is increased to clear both the truck and the container so that it is movable from a position surrounding the truck's platform to a position surrounding the container. After the carrier frame surrounds the container, it engages the container with chains and hooks. The container is then lifted by the carrier frame, which is itself lifted by hydraulic actuators. After the container is lifted sufficiently high enough to clear the truck's platform, the carrier frame (now with the container) is moved back to its original position surrounding the truck's platform. The container is then lowered onto the platform. Thereafter, the carrier frame's width is reduced, the carrier frame is secured to the platform, and the carrier frame's wheels are raised.

Although the truck disclosed in the '062 and '770 patents is a self-contained apparatus for lifting, handling, and transporting containers of a desirable width, its components are cumbersome and complex. Furthermore, loading and unloading of the truck is time consuming and inefficient. Additionally, the truck can load and unload containers from only its rear end.

Thus, a need exists for a vehicle for lifting, handling, and transporting containers of a desirable width that can be used to quickly and easily load and unload containers and transport them within the width restraints imposed by law. A further need exists for a vehicle for lifting, handling, and transporting containers that can load and unload containers from its sides.

BRIEF SUMMARY OF THE INVENTION

Certain embodiments of the present invention provide a system for lifting, handling, and transporting containers. The system employs a trailer that is either connectable to a truck or integral with a truck. In an embodiment of the invention, the trailer is equipped with channels that allow a wheeled dolly to travel back and forth between front and rear ends of the trailer so that the dolly can load and unload containers from the rear end of the trailer. In an embodiment of the invention, the dolly is rotatable in a manner similar to the turret of a tank or a crane so that the dolly can load and unload containers from sides of the trailer.

The dolly also includes lifting apparatus. In an embodiment of the invention, the lifting apparatus includes two yoke arms that are rotatable about an axis. The yoke arms also may be moveable laterally away from one another to provide additional clearance for engaging containers and medially back toward one another to provide reduced width for transport. The distal end of each yoke arm includes a cradle for lifting a container. Each cradle is rotatable about the distal end of the yoke arm to which it is attached so that the cradle can maintain a level orientation with respect to the ground despite that the yoke arms rotate with respect to the ground. By remaining level with respect to the ground, the cradles can lift and handle the container while maintaining the container in an upright orientation. Medial sides of the cradles include apparatus for attaching removable lifting extensions. The lifting extensions are configured to be insertable into and removable from corresponding holes of a container. The yoke arms and cradles may be adjustable in length to provide additional play for when a container to be lifted and loaded is not perfectly positioned with respect to the dolly. The trailer or dolly may include a ballast or outriggers for stabilizing the dolly when lifting, lowering, and handling containers.

In an embodiment of the present invention, after the dolly lifts a container from the rear end of the trailer, the dolly is returned to the front end of the trailer, and the dolly lowers the container onto a remaining portion of the trailer. In another embodiment of the present invention, after the dolly lifts a container from a side of the trailer, the dolly is rotated back so that it faces rearward, the dolly is returned to the front end of the trailer, and the dolly lowers the container onto a remaining portion of the trailer.

In an embodiment of the present invention, hydraulic actuators may control the longitudinal and rotational movements of the dolly, as well as the rotation of the yoke arms and the cradles. In other embodiments of the present invention, other mechanisms may be employed to control the above described movements.

In an embodiment of the present invention, adjusting the length of the yoke arms and cradles, moving the yoke arms medially and laterally, and raising and lowering outriggers may be done manually. In other embodiments of the present invention, the above described movements may be done mechanically.

Figure 1:
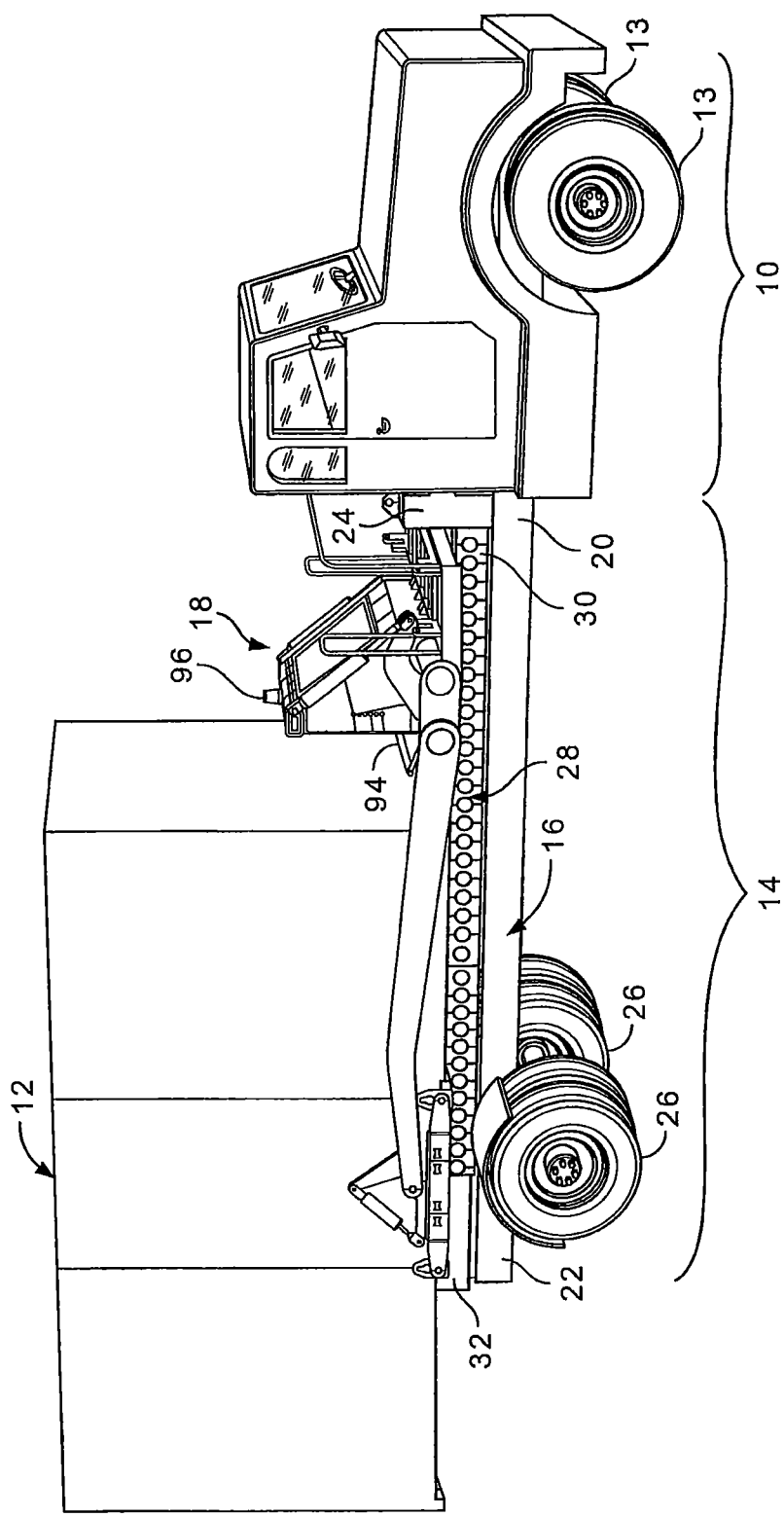
FIG. 1 illustrates an isometric view of a truck with trailer and container, according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a truck 10 for lifting, handling, and transporting a box-shaped container 12. The truck 10 includes ground-engaging wheels 13 and a trailer 14 that may be permanently affixed to the truck 10. Alternatively, the trailer 14 may be connectable to and detachable from the truck 10 through conventional truck-to-trailer connecting means. The trailer 14 includes a mounted dolly 18 for lifting, lowering, and handling containers 12.

Figure 2:
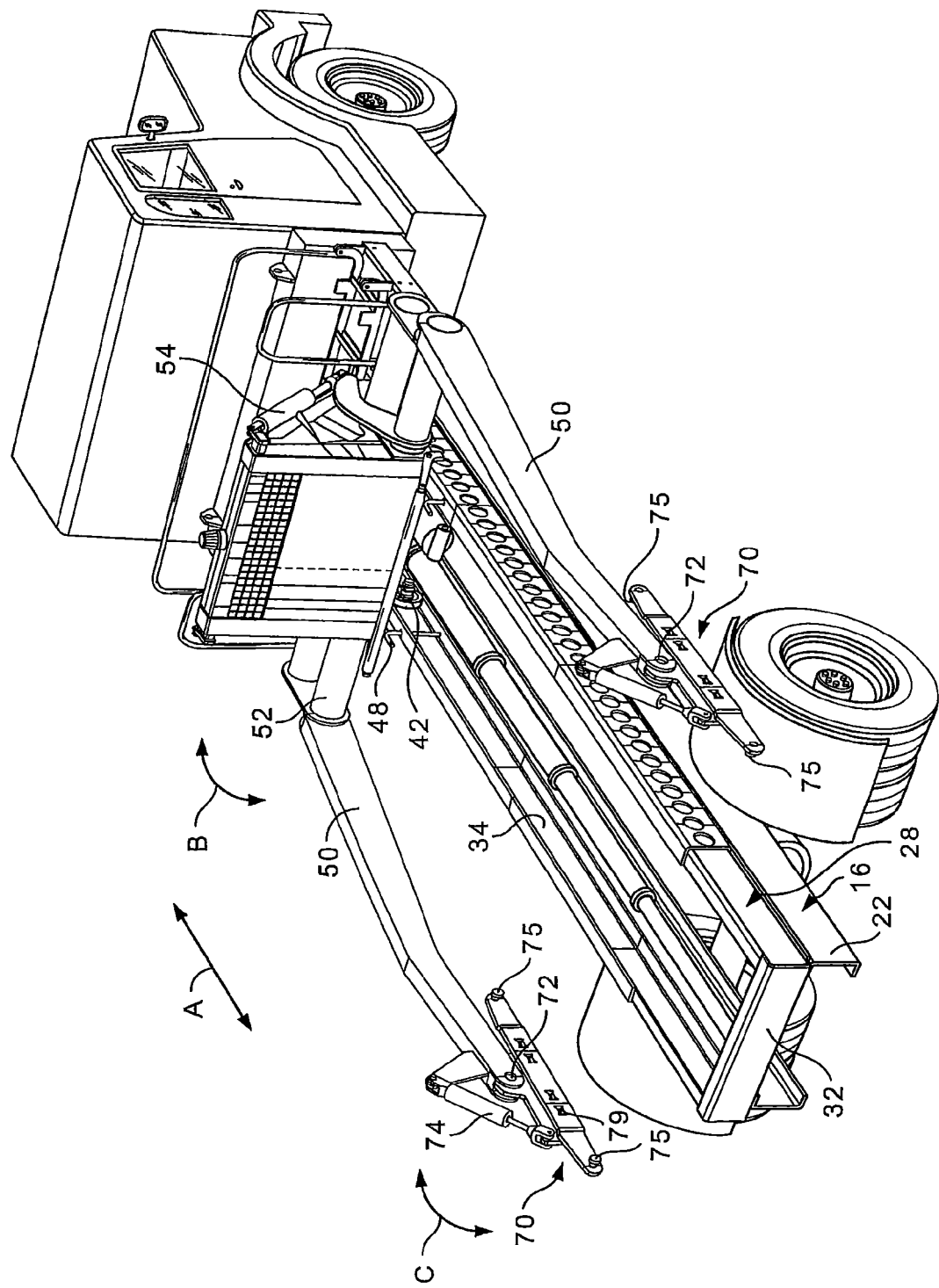
FIG. 2 illustrates an isometric view of a truck with trailer, according to an embodiment of the present invention.

With reference to FIGS. 1 and 2, the trailer 14 includes left and right steel bars 16 that run longitudinally between front and rear ends 20 and 22 of the trailer 14. The trailer 14 includes a ballast 24 located proximate the front end 20 and ground-engaging wheels 26 proximate the rear end 22. The steel bars 16 buttress a channel support structure 28 having a front end 30 and a rear end 32. The front end 30 of the channel support structure 28 is proximate with the front end 20 of the trailer 14 while the rear end 32 of the channel support structure 28 is proximate with the rear end 22 of the trailer 14. The channel support structure 28 includes left and right channels 34 and 36 (illustrated in FIGS. 2 and 3, respectively) extending between the front and rear ends 30 and 32 of the channel support structure 28. The left and right channels 34 and 36 are configured to allow four dolly wheels 42 to roll therein. Rolling of the dolly wheels 42 within the left and right channels 34 and 36 allows the dolly 18 to move longitudinally back and forth in the directions designated by arrow A in FIG. 2.

Figure 4:
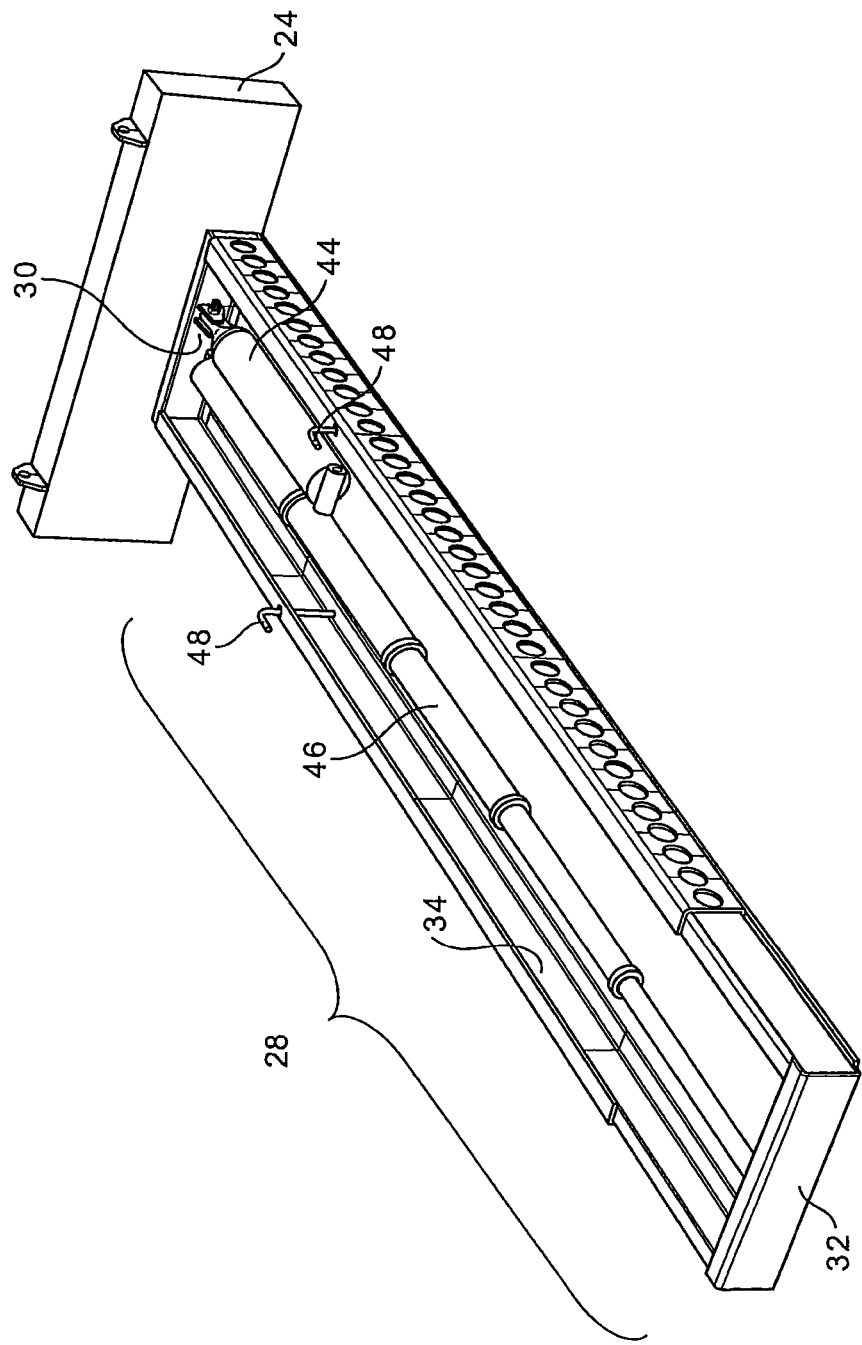
FIG. 4 illustrates an isometric view of a portion of a trailer, according to an embodiment of the present invention.

FIG. 4 illustrates the channel support structure 28 in isolated detail. Two hydraulic dolly actuators 44 and 46 work in a complimentary manner to propel the dolly 18 (not shown in FIG. 4) between the front and rear ends 30 and 32 along the channel support structure 28. Extension of the rearward dolly actuator 44 propels the dolly 18 toward the rear end 32 while extension of the frontward dolly actuator 46 propels the dolly 18 toward the front end 30. Removable locking pins 48 can be inserted into the channel support structure 28 to secure the dolly 18 in the travel position (i.e., when the truck 10 and trailer 14 are being driven). In the travel position, the locking pins 48 intersect the channels 32 and 34 as illustrated in FIGS. 2 and 4. The locking pins 48 prevent rearward rolling of the dolly wheels 42 during driving of the truck 10 and trailer 14.

With reference to FIG. 2, the dolly 18 includes two cantilevered yoke arms 50 that extend rearward from rotating beams 52. The yoke arms 50 rotate via rotation of the rotating beams 52 along a path designated by arrow B. Hydraulic yoke actuators 54 control the rotation of the yoke arms 50 by shortening and extending in a telescopic fashion.

Figure 3:
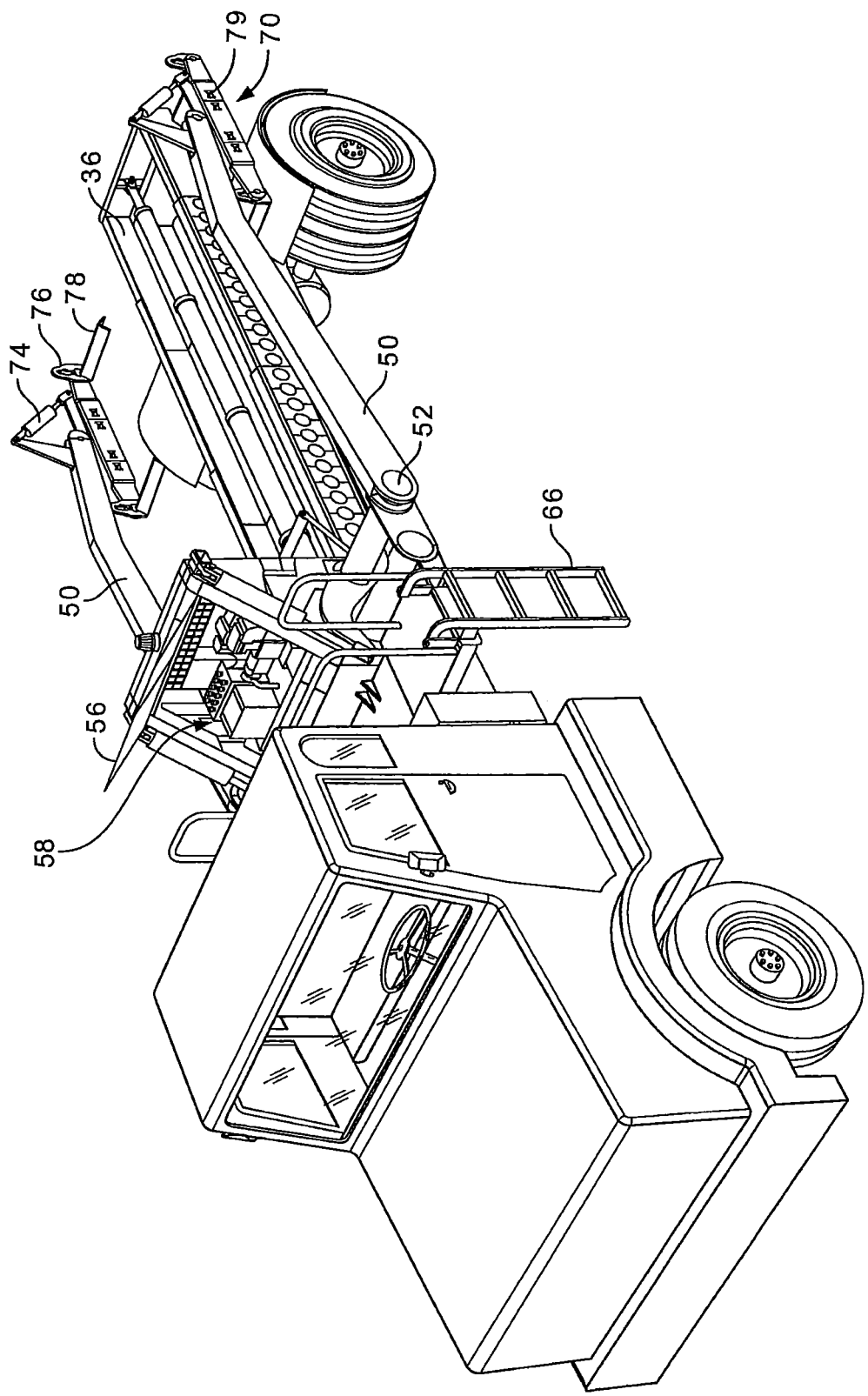
FIG. 3 illustrates an isometric view of a truck and trailer, according to an embodiment of the present invention.
Figure 5:
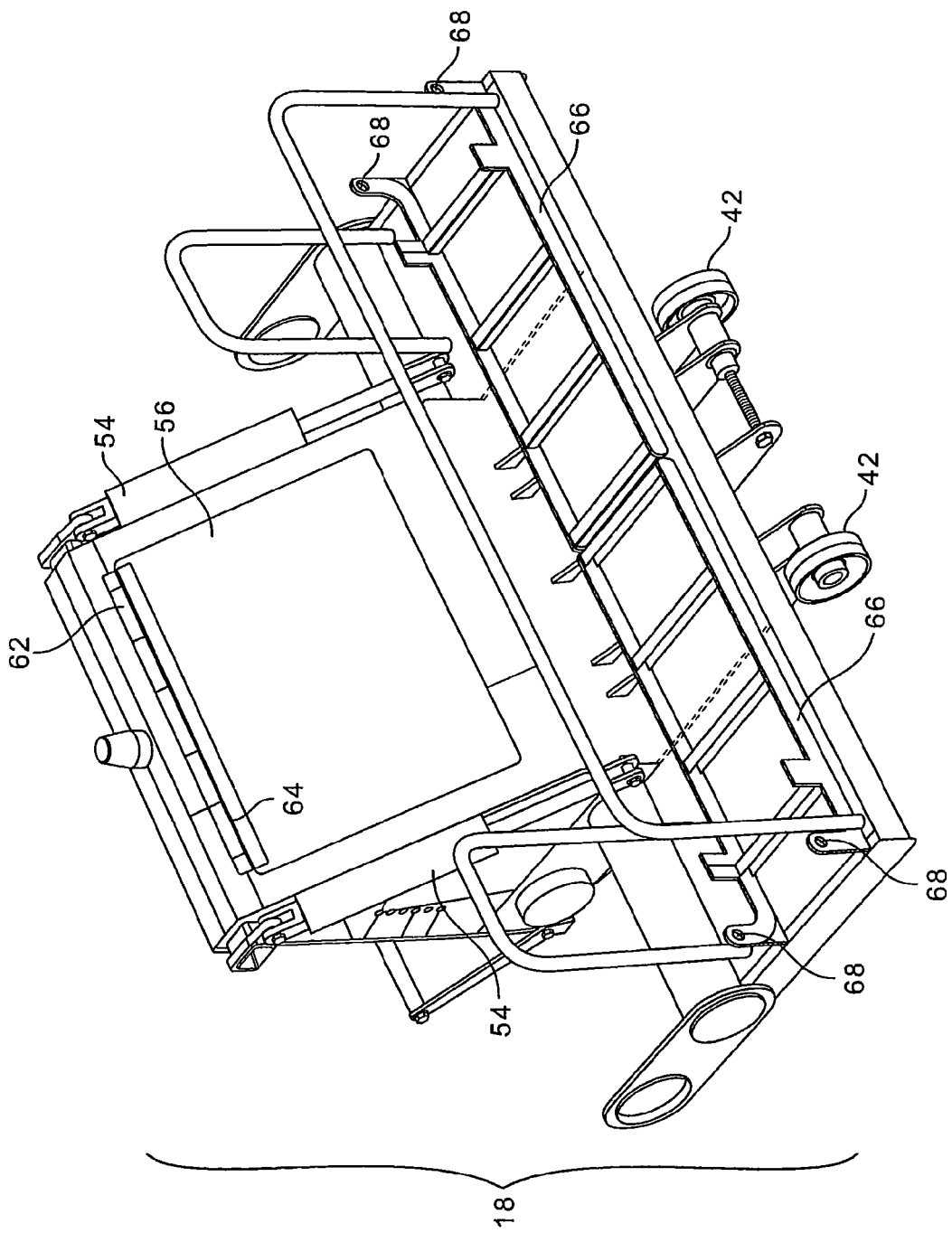
FIG. 5 illustrates an isometric view of a portion of a dolly, according to an embodiment of the present invention.

FIGS. 3 and 5 illustrate the dolly 18 in further detail. (Note, FIG. 5 illustrates the dolly 18 without the yoke arms 50 and the rotating beams 52.) The dolly 18 includes a hood 56 for accessing a power module 58 contained therein for controlling hydraulic actuators 44, 46, 54, and 74. The hood 56 opens and closes via a hinge 62 located along an upper edge 64 of the hood 56. FIG. 5 illustrates the hood 56 in a closed configuration for operation while FIG. 3 illustrates the hood 56 in an open configuration for service. The dolly 18 also includes service ladders 66 that are rotatable about pivots 68 between a stored configuration (illustrated in FIG. 5) and a deployed configuration (illustrated in FIG. 3).

With respect to FIG. 2, each of the yoke arms 50 includes a cradle 70 located distally from the rotating beams 52. The cradles 70 are rotatable about pivots 72 along a path designated by arrow C. Hydraulic cradle actuators 74 control the rotation of the cradles 70 by shortening and extending in a telescopic fashion. Rotation of the cradles 70 about the pivots 72 allows the cradles 70 to remain level with respect to the ground despite rotation of the yoke arms 50. By remaining level with respect to the ground, the cradles 70 can lift and handle the container 12 while maintaining the container 12 in an upright orientation. It should be further appreciated that because the cradles 70 are rotatable about the pivots 72, the dolly 18 can lift the container 12 from an angled surface and lower the container 12 to an angled surface.

Each cradle 70 includes a pair of headed pins 75 protruding medially therefrom. Each headed pin 75 is configured to receive and secure a bracket 76 of a removable lifting extension 78. FIG. 2 illustrates the cradles 70 without the removable lifting extensions 78 while FIG. 3 illustrates the cradles 70 with the removable lifting extensions 78 attached.

Also, the cradles 70 include extension zones 79 that allow for manually adjusting the length of the cradles 70. Although not illustrated in detail, the cradles 70 may be comprised of multiple components that can be pushed or pulled past one another within the extension zones 79 to shorten and lengthen the cradles 70. The extension zones 79 may include pins that are insertable into, and removable from, holes in the components of the cradle 70 for fixing the components to one another and releasing the components from one another. Adjusting the length of the cradles 70 allows some play for when the container 12 to be lifted and loaded is not perfectly positioned with respect to dolly 18.

Figure 6:
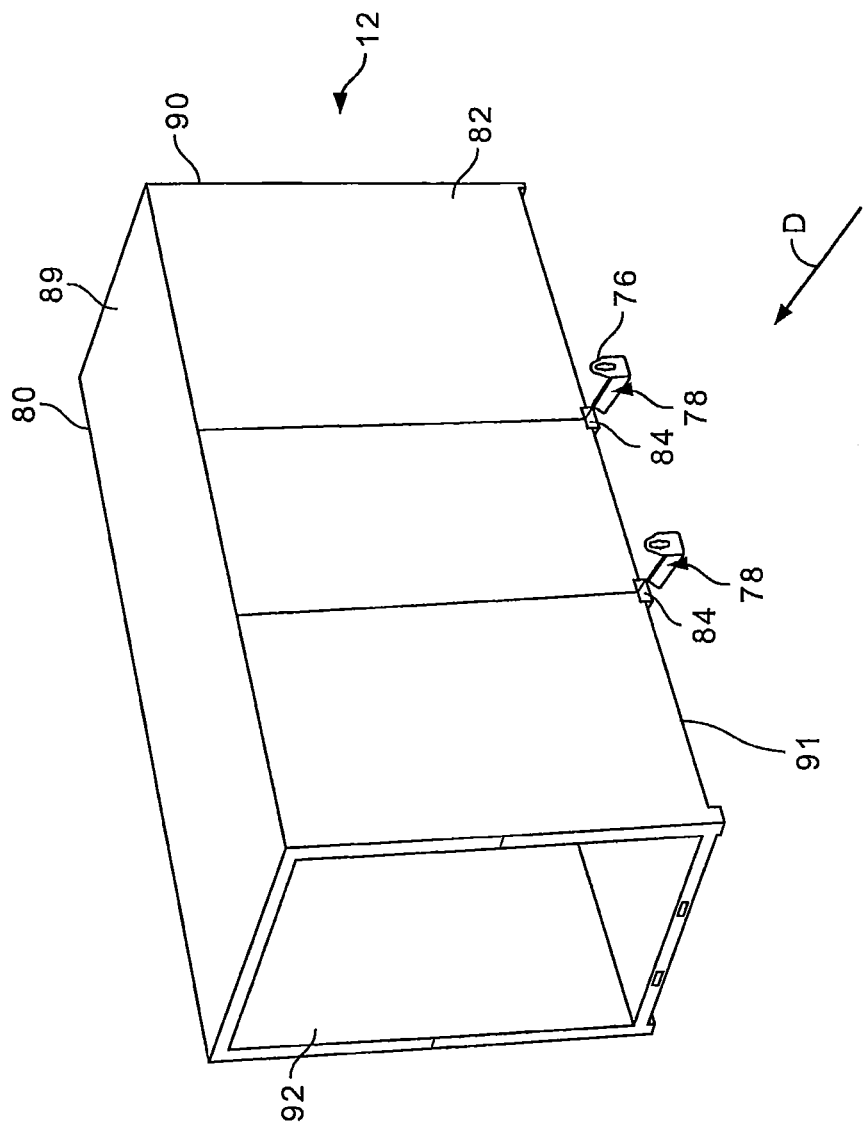
FIG. 6 illustrates an isometric view of a container and lifting extensions, according to an embodiment of the present invention.

FIG. 6 illustrates the container 12. The container 12 includes left and right walls 80 and 82 that include rectangular holes 84 for receiving the removable lifting extensions 78.

The holes 84 are located at the bottom of the left and right walls 80 and 82. The container 12 also includes a top side 89, front wall 90, bottom side 91, and a rear opening 92. The rear opening 92 can be closed by well known conventional door means used in the shipping industry (not illustrated). FIG. 6 illustrates the removable lifting extensions 78 aligned for insertion into the holes 84 of the right wall 82 in a direction designated by arrow D.

With reference to FIG. 1, the dolly 18 includes an engaging bar 94 that extends rearward for contacting containers 12. A light 96 will light up to indicate when the engaging bar 94 is depressed by the front wall 90 of the container 12.

In the unloaded travel position (FIG. 2), the dolly 18 is located and secured at the front end 30 of the channel support structure 28. When the truck 10 arrives at a location to pick up the container 12, the removable lifting extensions 78 are inserted into the holes 84 in the container 12 as contemplated in FIG. 6. The locking pins 48 are removed temporarily to allow the dolly wheels 42 to roll rearward within the channels 34 and 36. With the locking pins 48 removed, the dolly 18 is propelled rearward by the telescopic extension of the rearward dolly actuator 44. As the dolly 18 moves rearward to engage the container 12, the cradles 70 narrowly pass beyond the left and right walls 80 and 82 of the container 12. It is noted that removal of the removable lifting extensions 78 allows for the cradles 70 to be positioned a distance only slightly greater than the width of the container 12 while still maintaining enough clearance to engage the container 12.

When the dolly 18 fully engages the container 12, the front wall 90 of the container 12 will depress the engaging bar 94. Depressing the engaging bar 94 causes the light 96 to light up thereby indicating that the container 12 is properly positioned relative to the dolly 18 for lifting. If the dolly 18 does not fully engage the container 12, the cradles 70 may be manually adjusted in length at the extension zones 79. If adjusting the length of the cradles 70 is not sufficient, the truck 10 may be driven rearward slightly and carefully as necessary.

Figure 7:
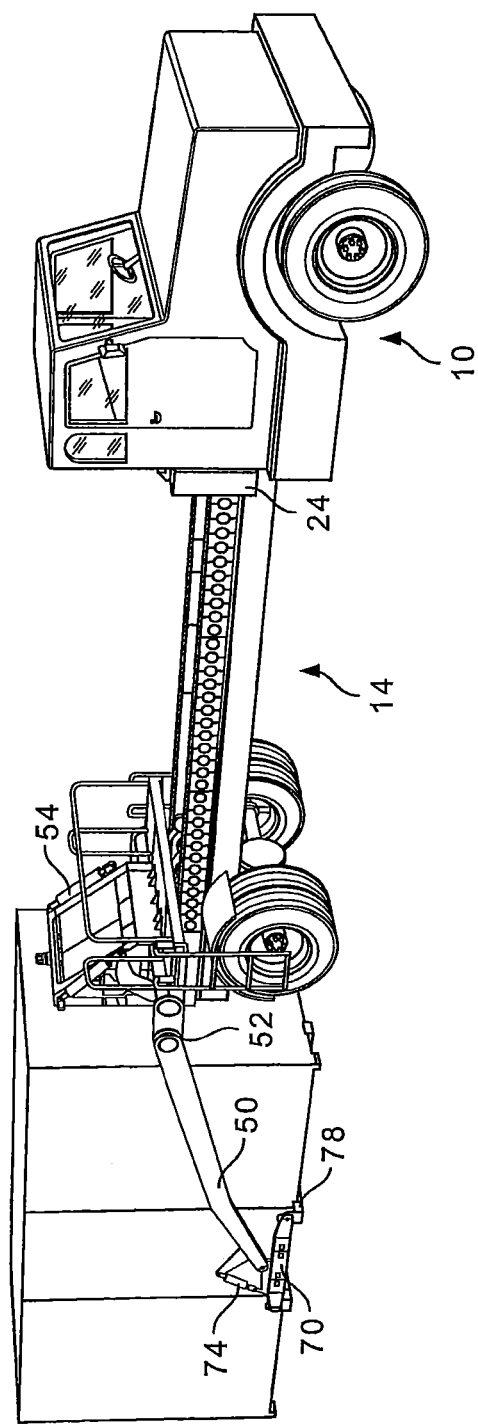
FIG. 7 illustrates an isometric view of a truck with trailer and container, according to an embodiment of the present invention.

After the light 96 lights up, the yoke actuators 54 rotate the yoke arms 50 downward to the position shown in FIG. 7. As the yoke arms 50 are lowered, the cradle actuators 74 rotate the cradles 70 to maintain the cradles 70 parallel to the ground. The removable lifting extensions 78, which have already been inserted into the holes 84 of the container 12, are fastened to the cradles 70 by passing the brackets 76 over the headed pins 75. Employment of the brackets 76 and headed pins 75 as the mechanism for fastening the removable lifting extensions 78 to the cradles 70 allows some additional play for when the container 12 to be lifted and loaded is not perfectly positioned with respect to the dolly 18.

With the lifting extensions 78 fastened to the cradles 70, the container 12 is then lifted off the ground by the yoke arms 50. During lifting, the container 12 is kept upright by the cradles 70 which remain parallel to the ground. The cradles 70 remain parallel to the ground by rotating about the pivots 72 to compensate for the rotation of the yoke arms 50 about the rotating beams 52. The truck 10 and trailer 14 are kept upright during lifting by the ballast 24. Without the counterweight of the ballast 24, the weight of the container 12, when being lifted by the dolly 18, could cause the ground-engaging wheels 13 of the truck 10 to lift off of the ground.

Figure 8:
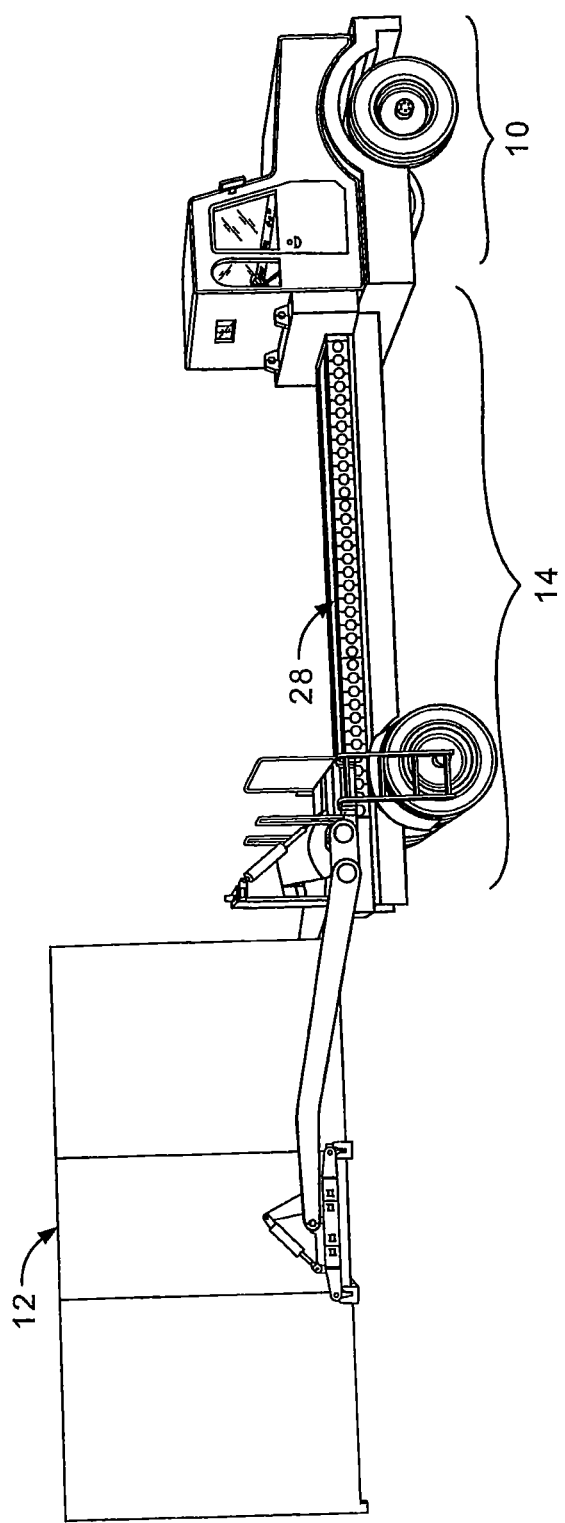
FIG. 8 illustrates an isometric view of a truck with trailer and container, according to an embodiment of the present invention.

Once the container 12 is lifted to a height slightly above the channel support structure 28 as shown in FIG. 8, the dolly 18 is propelled frontward by the frontward dolly actuator 46. When the dolly 18 reaches the front end 30, the dolly 18 is secured by replacing the locking pins 48. The yoke arms 50 are then rotated downward to lower the container 12 onto a remaining portion of the channel support structure 28 of the trailer 14.

The fully loaded position is illustrated in FIG. 1. In that position, the truck 10 is driven to a desired location for unloading. During driving, the weight of container 12 is supported by the channel support structure 28, and movement of the container 12 is prevented by the yoke arms 50, cradles 70, and lifting extensions 78 that secure the container 12. Once at the desired location, the locking pins 48 are removed, and the yoke arms 50 are rotated upward slightly to lift the container 12 off of the channel support structure 28. The dolly 18 is again propelled rearward by the rearward dolly actuator 44. The yoke arms 50 lower the container 12 to the ground. Once the container 12 is resting on the ground, the lifting extensions 78 are detached from the cradles 70 by passing the brackets 76 over the headed pins 75. The dolly 18 is returned to the unloaded travel position (FIG. 2). The removable lifting extensions 78 are removed from the holes 84 in the container 12 and retained for future use.

Figure 9:
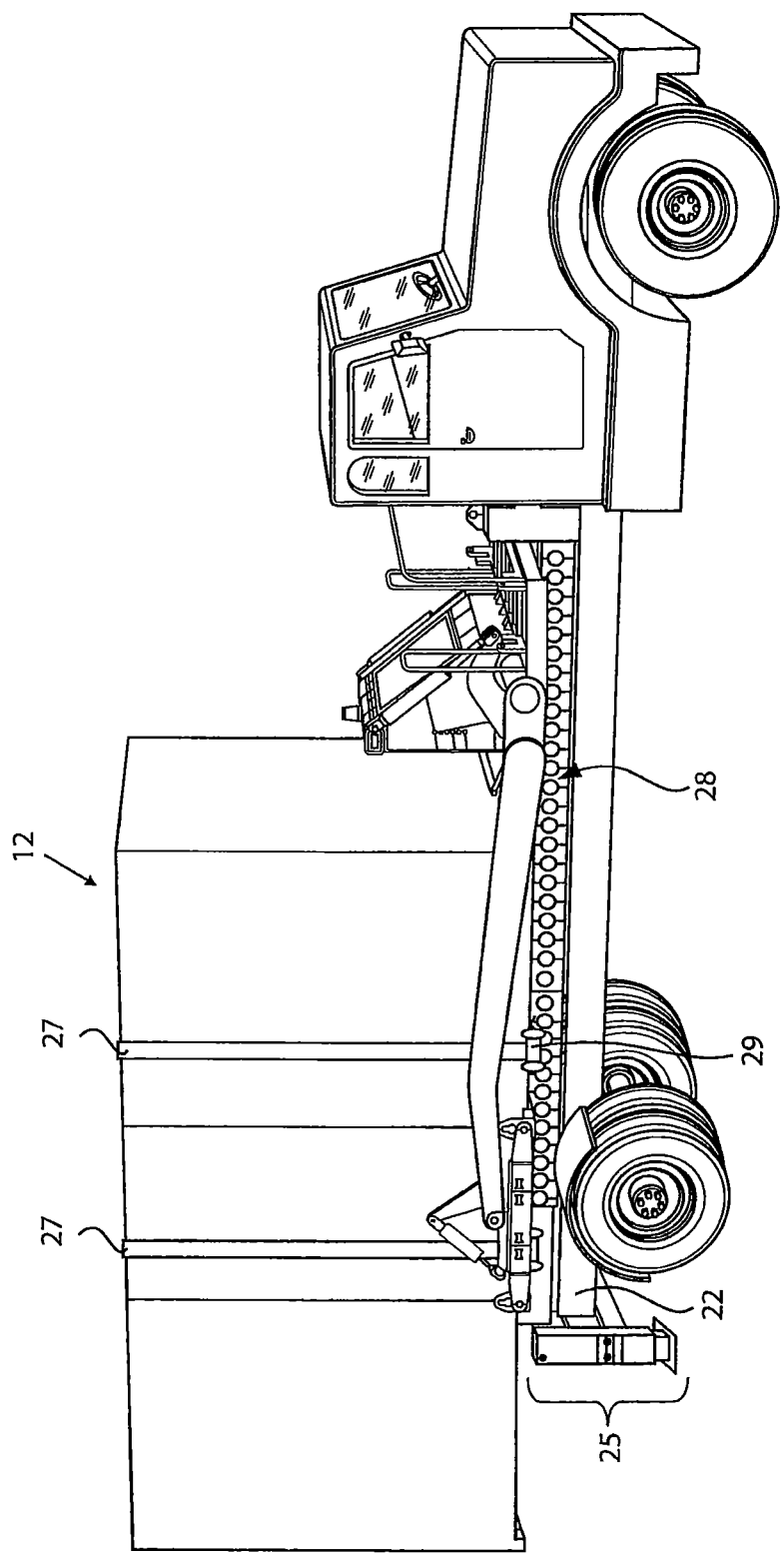
FIG. 9 illustrates an isometric view of a truck with trailer and container, according to an embodiment of the present invention.

Instead of, or in addition to, the ballast 24, the dolly 18 may be kept upright by the use of left and right outriggers 25 that can be raised and lowered from the rear end 22 of the trailer 14 as illustrated in FIG. 9 (only one outrigger 25 is visible in FIG. 9). The outriggers 25 can be raised for when the truck 10 is driven and lowered for when the dolly 18 is lifting, lowering, and handling the container 12. FIG. 9 illustrates the raised position.

With reference to FIG. 9, the container 12 can be additionally secured to the trailer 14 for travel via straps 27. The straps 27 are deployed from, and can be tightened by, ratcheting winches 29 that are secured to the channel support structure 28.

While certain embodiments described above employ yoke arms 50 of a fixed length, other embodiments may include alternative yoke arms that are adjustable in length. For example, other embodiments of the present invention may employ yoke arms that are manually adjustable in length in a manner similar to that of the cradles 70 at the extension zones 79. Adjusting the length of the yoke arms provides additional play when the container 12 to be lifted and loaded is not perfectly positioned with respect to the dolly 18.

Figure 10:
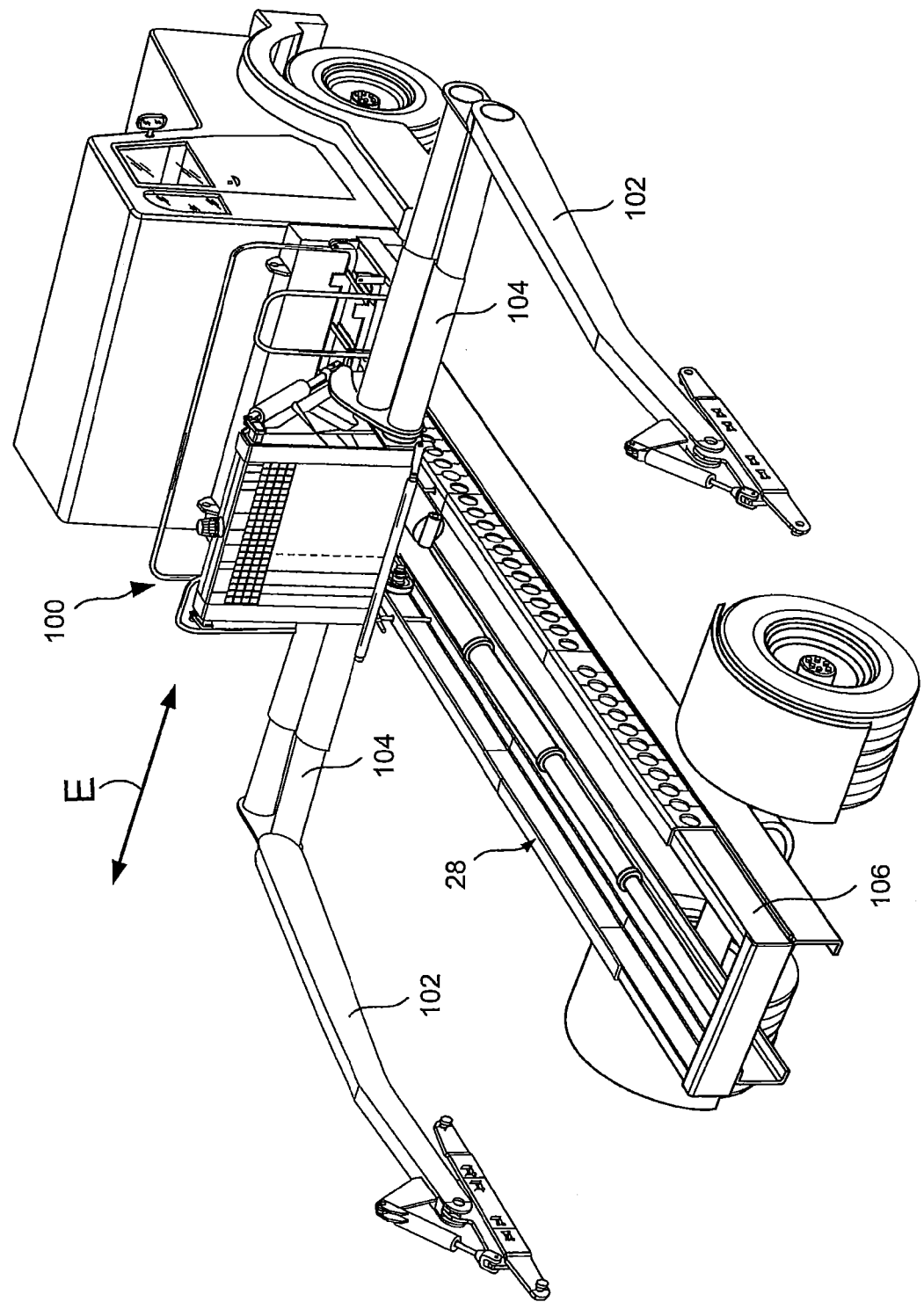
FIG. 10 illustrates an isometric view of a truck with trailer, according to an embodiment of the present invention.

While certain embodiments described above employ left and right yoke arms 50 of a fixed distance from one another, other embodiments may include alternative yoke arms that are adjustable in their distance from one another. For example, FIG. 10 illustrates an embodiment of the present invention in which a dolly 100 includes left and right yoke arms 102 that can be adjusted laterally to provide increased clearance for lifting, lowering, and handling the container 12 (not shown in FIG. 10). The dolly 100 includes rotating beams 104 that, in addition to being rotatable, are telescopic, allowing the yoke arms 102 to be moved laterally and medially in the directions designated by arrow E. Accordingly, the yoke arms 102 are moveable laterally away from one another to a working configuration and medially back toward one another to a stowed (i.e., travel) configuration. In FIG. 10, the yoke arms 102 are positioned in the working position. The increased clearance of the yoke arms 102 in the working configuration allows for lifting, lowering, and handling of a container 12 that is of the maximum width allowed under applicable laws.

After loading the container 12, the yoke arms 102 are rotated downward beneath the bottom surface 91 of the container 12 and moved medially toward one another to a stowed positioned (not shown). The yoke arms 102 are moveable laterally and medially by manually extending and shortening the rotating beams 104 of the yoke arms 102 in a telescopic fashion. Although not shown in FIG. 10, the rotating beams 104 may be located at an elevation at or below the elevation of the channel support structure 106 so that the yoke arms 102 can be moved medially toward one another to the stowed positioned while passing easily below the bottom surface 91 (see FIG. 6) of a loaded container 12 (not shown in FIG. 10).

Because the yoke arms 102 are stowed below the container 12 during travel, the yoke arms 102 do not secure the container 12 during travel. Accordingly, the container 12 must be secured by some other means to prevent movement during travel. The straps 27 and ratcheting winches 29 of FIG. 9, for example, may be used in the embodiment illustrated in FIG. 10.

While certain embodiments described above rely on dolly actuators 44 and 46 to move the dolly 18 rearward and forward (e.g., FIG. 2), other embodiments may include alternative devices for positioning a dolly. For example, a winch and cable system could be used to roll the dolly 18 between the front and rear ends 30 and 32 of the channel support structure 28.

Figure 11:
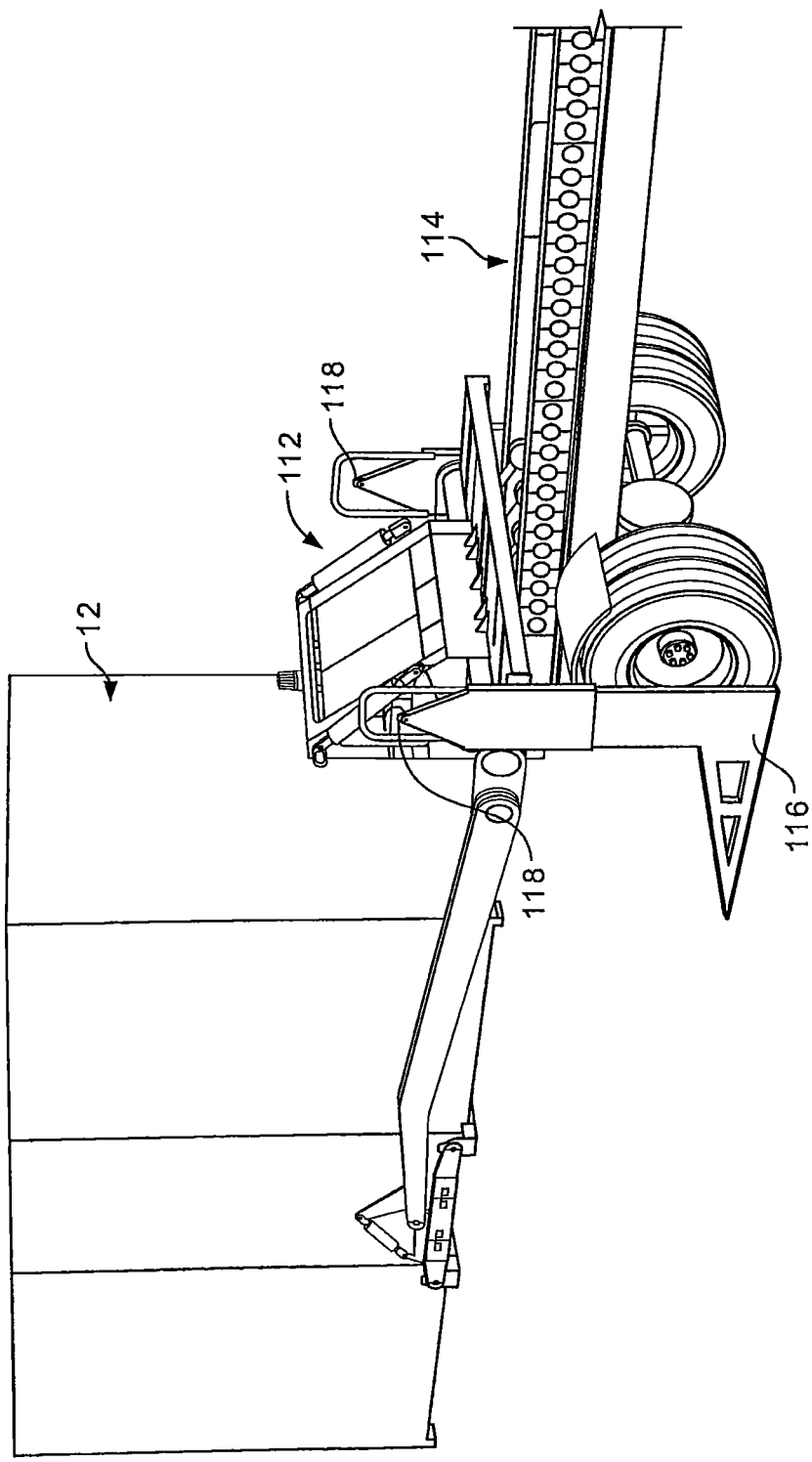
FIG. 11 illustrates an isometric view of a portion of a trailer with container, according to an embodiment of the present invention.

Optionally, the dolly 18 could be stabilized with respect to the ground by dolly outriggers and then rolled forward and rearward by the rearward and forward driving of the truck, respectively. For example, FIG. 11 illustrates a dolly 112 that is rollable along a channel support structure 114. The dolly 112 does not include dolly actuators or a winch and cable to move the dolly 112 along the channel support structure 114. Instead, the dolly 112 is rolled frontward and rearward along the channel support structure by driving the truck and trailer rearward and frontward, respectively. The dolly 112 includes dolly outriggers 116 that can be lowered to contact the ground as shown in FIG. 11. The dolly outriggers 116 can be raised and lowered via hydraulic outrigger actuators 118 (only the top portions of the outrigger actuators 118 are visible in FIG. 11) that extend and shorten in a telescopic fashion. When the dolly outriggers 116 are deployed to contact the ground (the configuration shown in FIG. 11), the dolly 112 becomes fixed in place with respect to the ground. With the dolly 112 fixed in place with respect to the ground, the truck and trailer can be driven carefully rearward or frontward to roll the dolly 112 along the channel support structure 114 in the opposite direction. The dolly outriggers 116 are also used for stabilizing the dolly 112 when lifting, lowering, and handling the container 12. Thus, the embodiment disclosed in FIG. 11 may not require the use of a ballast.

While certain embodiments described above employ a dolly 18 that lifts and lowers containers from only the rear end 22 of the trailer 14, other embodiments may include a dolly that is rotatable in manner similar to the turret of a tank or a crane so that the dolly can lift and lower containers from sides of the trailer.

Figure 12:
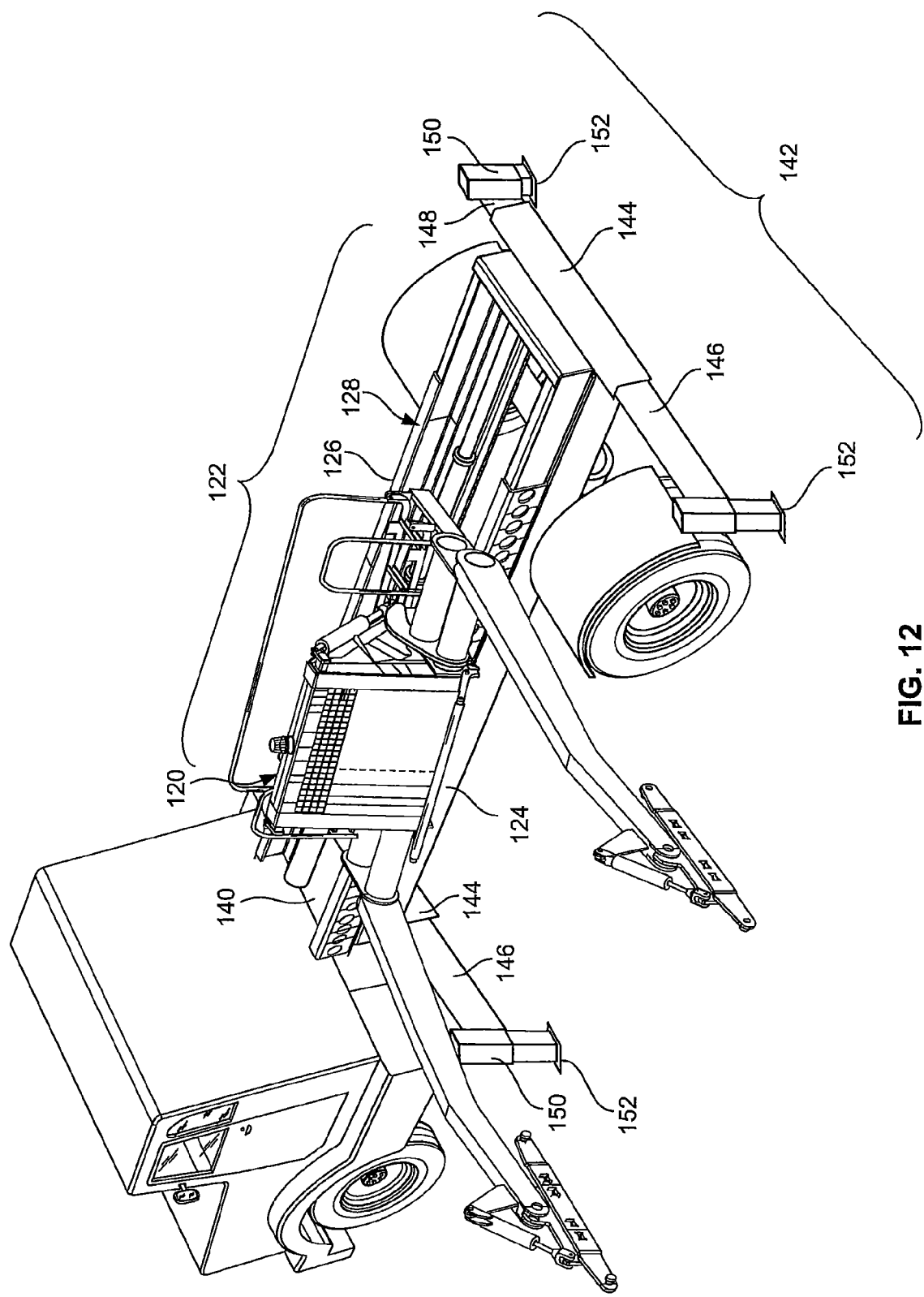
FIG. 12 illustrates an isometric view of a truck with trailer, according to an embodiment of the present invention.

For example, FIG. 12 illustrates an embodiment of the invention having a dolly 120 that is moveable longitudinally along a channel support structure 128 of a trailer 122 (e.g., in the same manner as the dolly 18 in FIG. 1). The dolly 120 of FIG. 12 is also rotatable so that the dolly 120 can face sideways to lift and lower a container (not shown) from left and right sides 124 and 126 of a trailer 122. The dolly 120 is rotatable by known conventional means. For example, a worm gear mechanism similar to that described in U.S. Pat. No. 4,527,458 to Johnson or U.S. Pat. No. 5,007,543 to Cooke (both of which patents are incorporated by reference) may be employed to drive the rotation of the dolly 120.

In the embodiment of FIG. 12, after the dolly 120 lifts a container from one of the sides 124 and 126 of the trailer 122, the dolly 120 is rotated to face rearward, the dolly 120 is moved to the front end 140 of the trailer 122, and the dolly 120 lowers the container 12 onto a remaining portion of the trailer 122.

The dolly 120 includes outriggers 142 for stabilizing the dolly 120 when lifting, lowering, and handling containers from the sides 124 and 126 of the trailer 122. Each of the front and rear outriggers 142 includes a fixed bar 144 that houses left and right outrigger arms 146 and 148. The outrigger arms 146 and 148 are telescopically extendable with respect to the fixed bars 144. (In FIG. 12, the left outrigger arms 146 are extended while the right outrigger arms 148 are stowed.) Each of the outrigger arms 146 and 148 includes an outrigger leg 150. Each outrigger leg 150 includes a pad 152 that can be raised to a stowed position or lowered to a working position in which the pad 152 contacts the ground. (In FIG. 12 the pads 152 on the left hand side of the trailer 122 are in the working position while the pads 152 on the right hand side of the trailer 122 are in the stowed position.) Although not illustrated, the dolly 120 may include a ballast instead of, or in addition to, the outriggers 142.

Figure 13B:
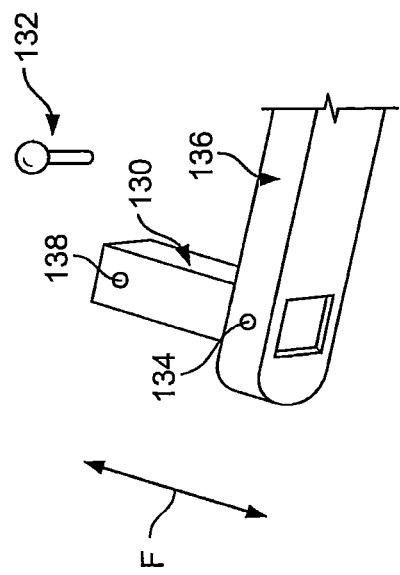
FIGS. 13a and 13b illustrate isometric views of a lifting extension, according to an embodiment of the present invention.
Figure 13A:
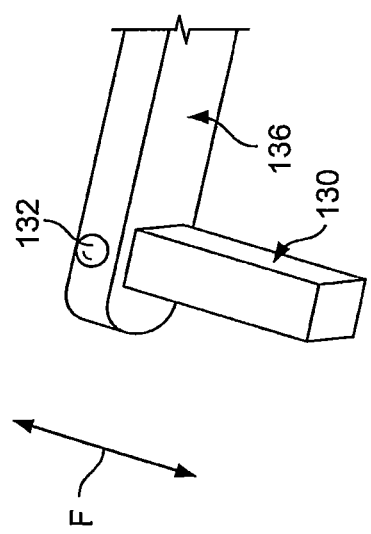

While certain embodiments described above employ a lifting extension 78 that is detachable from the cradle 70, other embodiments may include alternative lifting extensions. For example, FIGS. 13a and 13b illustrate a lifting extension 130 that is slidable transversely in the directions designated by arrow F. A pin 132 is removable from a pinhole 134 in a cradle 136 and a pinhole 138 in the lifting extension 130. When the pin 132 is removed from the pinholes 134 and 138, the lifting extension 130 can be slid laterally to allow the yoke arms (not shown) to surround the container 12. Once the yoke arms and attached cradles 136 are positioned around the container 12, the lifting extensions 130 can be slid medially and into holes 84 of the container 12. The pin 132 is then inserted through the pinholes 134 and 138 to secure the lifting extension 130 to the cradle 136.

While certain embodiments described above employ the outriggers 25 in FIG. 9, the outriggers 116 in FIG. 11, and the outriggers 142 in FIG. 12, various outriggers are known in the art, such as those described in U.S. Pat. No. 3,754,777 to Riggs et al., U.S. Pat. No. 4,071,147 to Hornagold, U.S. Pat. No. 5,706,960 to Pitman et al., and U.S. Pat. No. 7,150,472 to Schneider (all four of which patents are incorporated by reference). Thus, other embodiments may include any known outrigger that is suitable for use with the present invention.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for lifting, handling, and transporting a container comprising:
   a trailer for receiving and holding the container, said trailer having front and rear ends and a dolly, said dolly comprising:
      three wheels for moving along at least a portion of said trailer between said front and rear ends, and
      two yoke arms for lifting and lowering the container in an upright orientation, said yoke arms extending from a pivoting axis on said dolly, said yoke arms rotating about said pivoting axis upward to lift the container and downward to lower the container.

2. The system of claim 1, wherein said yoke arms are moveable medially toward one another and laterally away from one another.

3. The system of claim 1, wherein each of said yoke arms is adjustable in length.

4. The system of claim 1, wherein each of said yoke arms is adjustable in length and each of said yoke arms includes a distal end and a cradle that is rotatable about said distal end.

5. The system of claim 1, wherein each of said yoke arms is adjustable in length and each of said yoke arms includes a distal end and a cradle that is rotatable about said distal end, said cradle being configured to hold a non-fixed lifting extension configured to be insertable into and removable from a corresponding hole in the container.

6. The system of claim 1, wherein each of said yoke arms is adjustable in length and each of said yoke arms includes a distal end and a cradle that is rotatable about said distal end, said cradle being adjustable in length and said cradle being configured to hold a non-fixed lifting extension configured to be insertable into and removable from a corresponding hole in the container.

7. The system of claim 1, wherein each of said yoke arms is adjustable in length and each of said yoke arms includes a distal end and a cradle that is rotatable about said distal end, said cradle being adjustable in length and said cradle being configured to hold a non-fixed lifting extension configured to be insertable into and removable from a corresponding hole in the container, the system further comprising a hydraulic actuator for moving said dolly along said trailer.

8. The system of claim 1, wherein each of said yoke arms is adjustable in length and each of said yoke arms includes a distal end and a cradle that is rotatable about said distal end, said cradle being adjustable in length and said cradle being configured to hold a non-fixed lifting extension configured to be insertable into and removable from a corresponding hole in the container, said dolly being proximate said rear end when said dolly lifts the container from the ground and said dolly being proximate said front end when said trailer is driven.

9. The system of claim 1, wherein each of said yoke arms is adjustable in length and each of said yoke arms includes a distal end and a cradle that is rotatable about said distal end, said cradle being adjustable in length and said cradle being configured to hold a non-fixed lifting extension configured to be insertable into and removable from a corresponding hole in the container, the system further comprising one of a ballast or an extendable outrigger for stabilizing said dolly when lifting and lowering the container.

10. The system of claim 1, wherein each of said yoke arms is adjustable in length and each of said yoke arms includes a distal end and a cradle that is rotatable about said distal end, said cradle being adjustable in length and said cradle being configured to hold a non-fixed lifting extension configured to be insertable into and removable from a corresponding hole in the container, the system further comprising an engaging bar configured to be depressed against a front end of the container when said dolly is positioned to lift the container.

11. The system of claim 1, wherein each of said yoke arms is adjustable in length and each of said yoke arms includes a distal end and a cradle that is rotatable about said distal end, said cradle being adjustable in length and said cradle being configured to hold a non-fixed lifting extension configured to be insertable into and removable from a corresponding hole in the container, said dolly being rotatable between a position in which said yoke arms extend rearward and a position in which said yoke arms extend laterally from a side of the trailer.

12. The system of claim 1, wherein said dolly is rotatable between a position in which said yoke arms extend rearward and a position in which said yoke arms extend laterally from a side of the trailer.

13. The system of claim 1, wherein said yoke arms are moveable medially toward one another and laterally away from one another, each of said yoke arms is adjustable in length and each of said yoke arms includes a distal end and a cradle that is rotatable about said distal end, said cradle being adjustable in length and said cradle being configured to hold a non-fixed lifting extension configured to be insertable into and removable from a corresponding hole in the container.

14. An apparatus for lifting and lowering a container of substantially the same width as the apparatus comprising:
two yoke arms extending from a pivoting axis, said yoke arms rotating about said pivoting axis upward to lift the container and downward to lower the container, wherein said yoke arms are moveable medially toward one another and laterally away from one another, each of said yoke arms including a distal end and cradle that is rotatable about said distal end, said cradle including a non-fixed lifting extension configured to be insertable into and removable from a corresponding hole in the container.

15. The apparatus of claim 14, wherein said yoke arms are adjustable in length.

16. The apparatus of claim 14, wherein said cradle is adjustable in length.

* * * * *